Inventor:
Willy Helbling

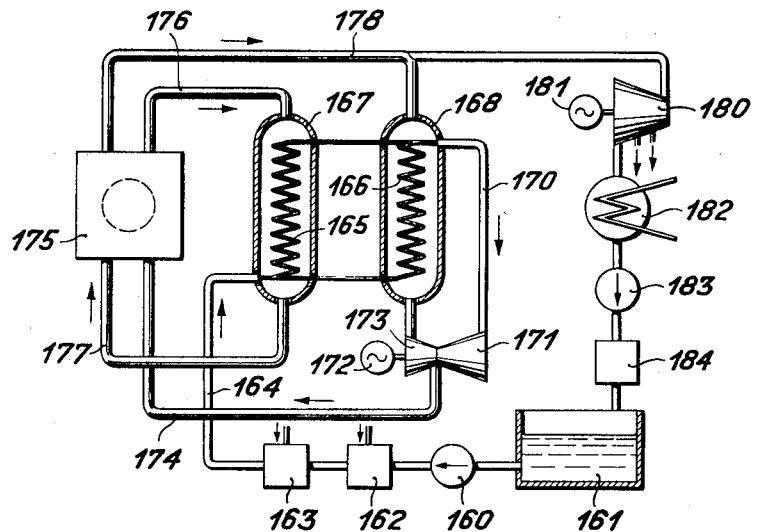
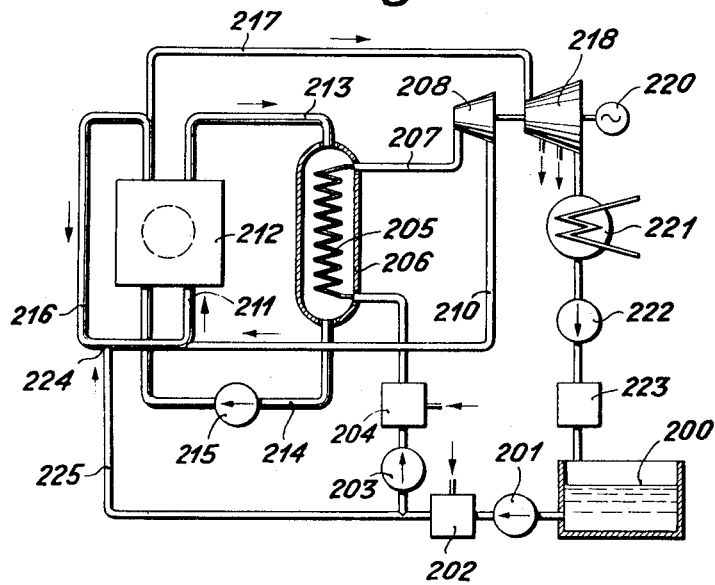

United States Patent Office 3,359,174
Patented Dec. 19, 1967

3,359,174
METHOD AND APPARATUS FOR EXTRACTING AND USING THE HEAT OF A NUCLEAR REACTOR
Willy Helbling, Winterthur, Switzerland, assignor to Sulzer Brothers Limited, Winterthur, Switzerland, a Swiss company
Filed Apr. 5, 1965, Ser. No. 446,794
Claims priority, application Switzerland, Apr. 3, 1964, 4,282/64
4 Claims. (Cl. 176—59)

The present invention relates to a method of extracting and using heat energy from a nuclear reactor by means of a vaporizable fluid working substance which is introduced in the liquid state into a heat exchanger outside the reactor. The working substance is evaporated and superheated in the heat exchanger by heat from the reactor, and it performs useful work in a turbine system. In accordance with the invention, after evaporation and superheating in the heat exchanger but before entering the reactor, the vaporized working substance is partly expanded in a turbine. It then enters the reactor for re-superheating, and flows therefrom to the heat exchanger to yield heat to newly arriving working substance for the vaporization and superheating of the latter.

The invention provides a nuclear reactor plant for practicing this method. The plant comprises a nuclear reactor and a heat exchanger outside the reactor core for evaporating and superheating the working substance. A turbine for partial expansion of the working substance is disposed between the secondary side of the heat exchanger and the reactor core, and the working substance vapor which, after partial expansion in the turbine, has been re-superheated in the reactor is supplied to the primary side of the heat exchanger for delivery of heat.

For operation of a nuclear reactor plant using an evaporable working substance, it has been suggested that that substance be evaporated and perhaps slightly superheated in an evaporator outside the reactor, that the vapor be further superheated in a number of passages through the reactor, that the superheated vapor be used to produce evaporation, and that some of the superheated vapor be used to perform useful work in a turbine system. With this known proposal, the reactor being upstream of the turbine, the pressure of the vaporous working substance in the reactor is as high or higher than in the turbine system, because of flow losses. High pressures cannot therefore readily be used since, for example in a reactor employing tubes for circulation of the vaporizable working substance therethrough, the high pressures would make it necessary to use tubes of considerable wall thickness, with a consequent impairment of reactor neutron economy. In pressure vessel type reactors it is difficult and undesirable, because of the risk of explosion, to expose the pressure vessels to very high pressures. Unfortunately, when the pressure is low, the thermal efficiency which the reactor plant can provide is lower than for a plant in which high pressures can be used.

It is an object of the invention to provide a method of extracting and using the heat energy of a nuclear reactor, which method shall employ working substance pressures substantially as high as the highest pressures used in combustion-fired steam boilers. The resulting thermal efficiency is similar to the thermal efficiency of boilers burning fossil fuels by oxidation combustion processes.

The invention will now be further described in terms of a number of exemplary embodiments and with reference to the accompanying drawings in which:

FIGS. 1, 2, 4, 5, 7 and 8 are schematic diagrams of nuclear reactor plants according to the invention;

Figure 1:
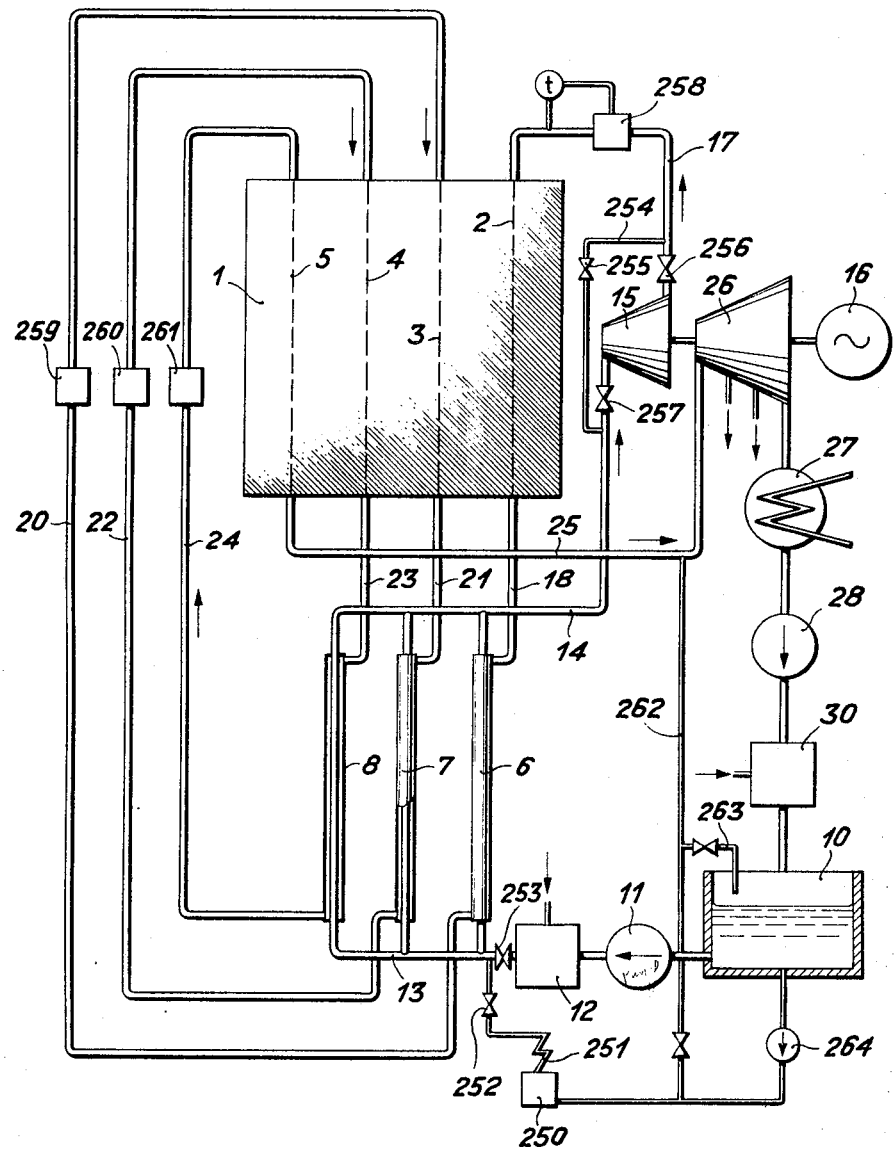

Referring to FIG. 1, a nuclear reactor 1 is traversed by groups of channels or tubes 2 to 5, hereinafter sometimes termed "pressure tubes." The channels of each group may be connected in parallel. In these channels, a vaporizable working substance is heated by contact with fissionable material. These channels or tubes extend through the reactor, contain nuclear fuel, and are of a size and design such as to withstand the positive pressure of the working substance. One form of pressure tube suitable for use as the channels 2 to 5 is disclosed in the copending application of Willy Helbling, Ser. No. 427,428, filed Jan. 22, 1965. Other types of reactor can however be used if they have provision for the working substance to make a number of passages through the reactor.

Heat exchangers 6 to 8 are disposed near the reactor core. A feed pump 11 pumps a vaporizable working substance such as water from a feed tank 10 through a preheater 12 and a line 13 to the secondary side of the parallel-connected heat exchangers 6 to 8 which evaporate and superheat the water, the same going from the heat exchangers through a collecting line 14 to a first or high-pressure stage 15 of a turbine system. The water vapor expands in the stage 15 and performs mechanical work which a generator 16 converts into electric power. The expanded vapor from the first turbine stage 15 passes through a line 17 to the reactor core 1 and flow through the group 2 of channels therein. From the channels 2 the now superheated water vapor passes through a line 18 to the primary side of heat exchanger 6 where it yields at least some of the heat received in the reactor to water newly arriving through line 13. The cooled vapor passes from the heat exchanger 6 through a line 20 to the channels 3 and therefrom through a line 21 to the heat exchanger 7 and therefrom through a line 22 to the channels 4, a line 23 and the heat exchanger 8. The vapor passes from the exchanger 8 through a line 24, the channels 5 and a line 25 to a second turbine stage 26 and therefrom to a condenser 27. The water condensed in the condenser 27 is returned via a condensate pump 28 and a preheater 30 to the tank 10.

Figure 2:
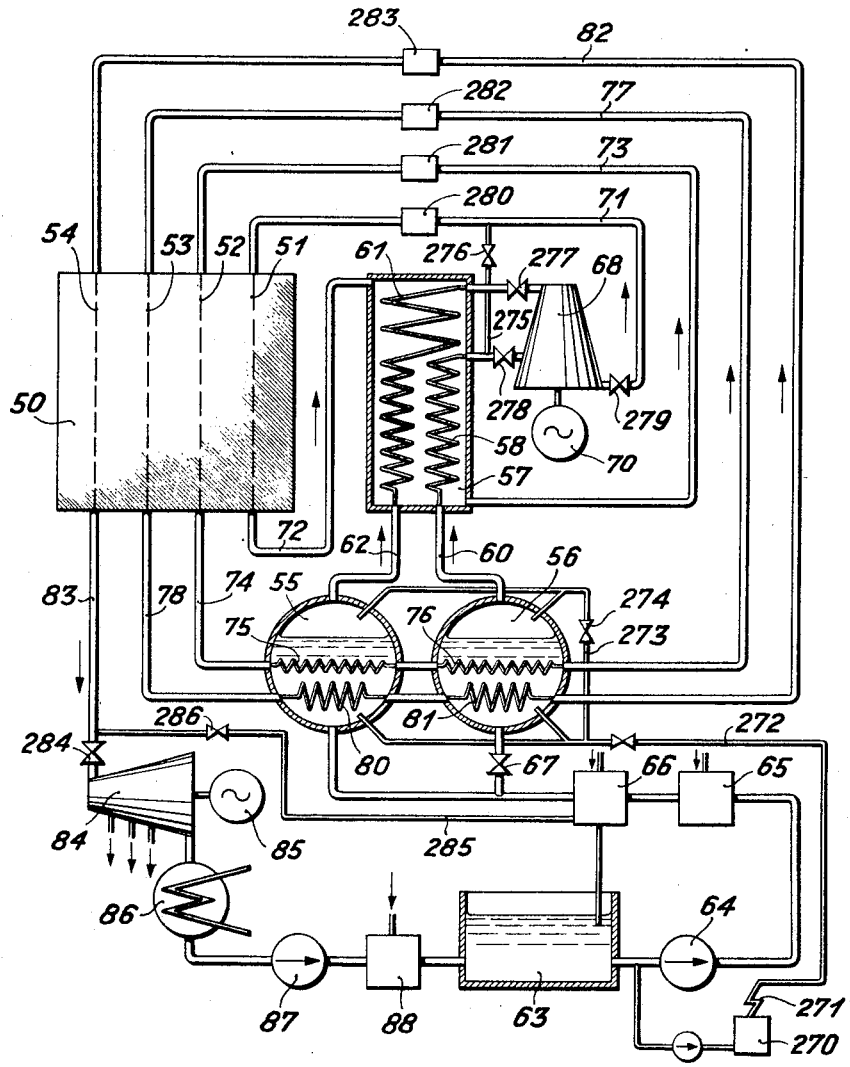

In the embodiment shown in FIG. 2, a reactor 50 is provided with groups of channels 51 to 54. Two drum-like heat exchangers 55, 56 serving as evaporators and a superheater 57 are disposed near the reactor. In these exchangers the drums constitute the secondary side wherein heat is absorbed from steam passing through the coils 75 and 76 which constitute the primary sides of those exchangers. The superheater 57 contains two pipe coils 58, 61. These coils constitute the secondary side of the superheater wherein heat is absorbed from the primary side constituted by the shell surrounding those coils. A line 60 connects the inlet of coil 58 to the vapor space of evaporator 56, and a line 62 similarly connects the coil 61 to the evaporator 55. A feed pump 64 supplies working substance, e.g. water, from a feed tank 63 through preheaters 65 and 66 to the two evaporators 55, 56. The feed line to the evaporator 56 includes a throttle element 67 which partly expands the liquid working substance supplied to the evaporator 56 so that the pressure therein is lower than in the evaporator 55. The higher-pressure vapor evolved in the evaporator 55 passes through the line 62 and the coil 61 of the superheater 57 to a high-pressure turbine 68. The vapor from the evaporator 56 passes through a line 60 to the coil 58 and is also supplied to the turbine 68 at a point appropriate to its lower pressure. A shaft connects the turbine 68 to a generator 70 which converts the mechanical energy of the turbine into electrical energy. The expanded vapor passes from the turbine 68 through a line 71 to the reactor channel 51 and therefrom it flows in the superheated state through a line 72 to the primary side of the superheater 57, where it flows over the exterior of coils 58 and 61 and yields heat to the vapor within them. The vapor which has come from reactor channels 51 then passes through a line 73 to the reactor channels 52 and thence through a line 74 to coils 75 and 76 in the evaporators 55 and 56 for vaporization of water therein. From coil 76 the vapor therein flows through a line 77 to the reactor channels 53 and thence through a line 78 to pipe coils 80, 81 of the evaporators 55, 56. The vapor in coil 81 then passes through a line 82 to the reactor channels 54 and leaves the same through a line 83 to a low-pressure turbine 84 driving an electric generator 85. The vapor emerging from the turbine 84 passes to a condenser 86. A condensate pump 87 delivers the condensate through a preheater 88 to the tank 63.

In the two embodiments of FIGS. 1 and 2 thus far described, the vaporous working substance enters the reactor only after expansion in a high-pressure turbine. The turbine therefore operates at a higher pressure than the reactor, so that the reactor does not experience the high pressure existing in the heat exchangers, i.e. in the evaporator-superheaters 6 to 8 of FIG. 1 and in the evaporators 55 and 56 and superheater 57 of FIG. 2. These elements can be separately designed to withstand the high pressures involved. Thus the reactor merely delivers heat at an appropriate temperature but does not experience the high pressure of the first turbine stage.

In these two embodiments the working substance, after evaporation, superheating and an initial expansion, makes a number of passages through the reactor in order to receive, and to transfer to the heat exchangers, sufficient heat for evaporation and superheating of the newly injected working substance which follows it. Although in both embodiments the vapor is ultimately supplied, after its passages through the reactor, to a second turbine stage or to a low-pressure turbine, it can be used for some other purpose, such as heating as distinguished from generation of mechanical energy. The provision of two evaporators (55, 56) in FIG. 2 permits the superheat of the vapor emerging from the reactor to be better used at the various evaporation temperatures obtaining at various pressures. A number of such evaporators of graded pressures and correspondingly graded temperatures can be disposed in series with one another for the flow of the heat-yielding superheated vapor but in parallel with one another for the flow of the working substance to be evaporated.

The invention makes it possible to operate steam nuclear plants at steam pressures as high as the highest pressures currently used in steam generators fired by combustion of fossil fuels. For instance, operation at supercritical pressure is readily possible. However, operation at a pressure just below critical has the advantage that at this subcritical pressure the working substance is still present in two phases. If, for instance, for any reason corrosion products which are accessible to radioactive contamination penetrate into the working substance, such products remain in the liquid phase of that substance and can be separated out by means of known and available filtering apparatus.

Figure 3:
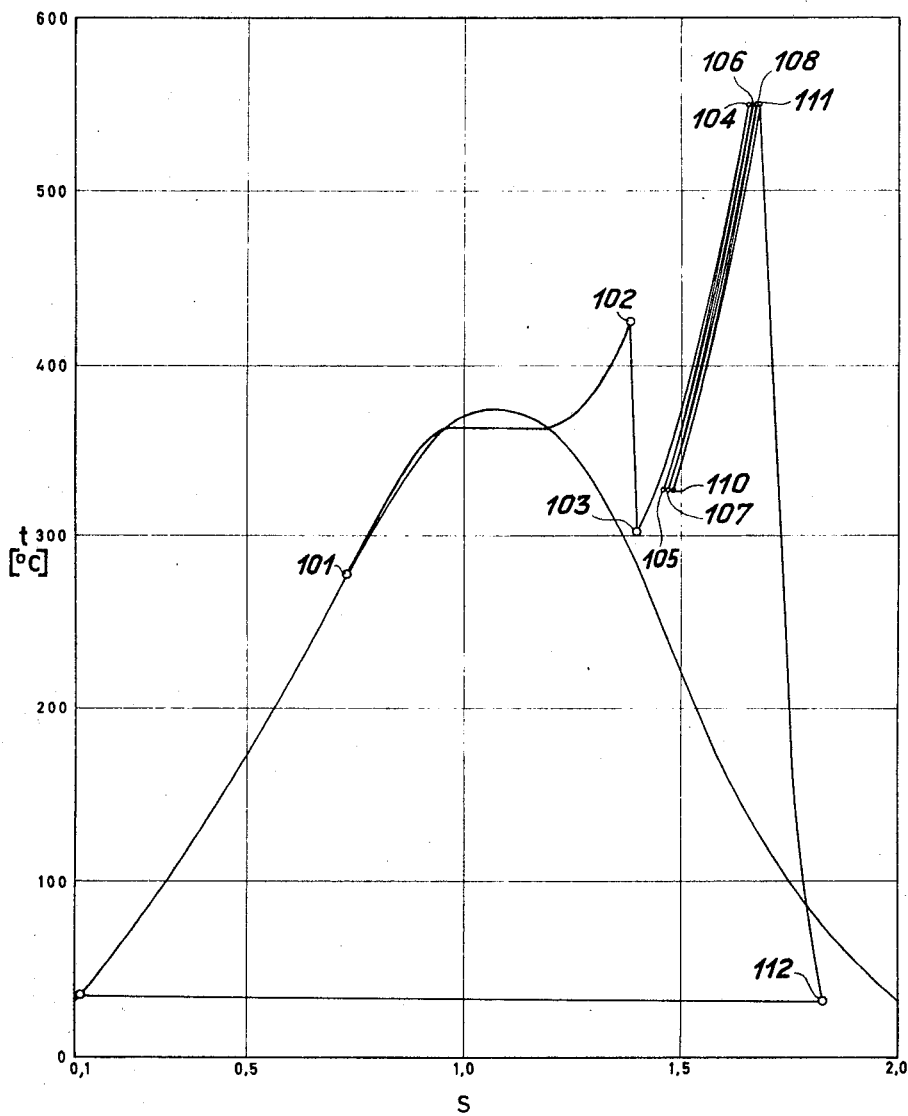
FIG. 3 is a temperature-entropy diagram for the plant shown in FIG. 1.

The temperature-entropy diagram (TS diagram) of FIG. 3 shows a circuit of this kind, i.e. of the type of FIGS. 1 and 2, operating at a very high subcritical pressure. In this diagram the curve between the points 101 and 102 represents preheating, evaporation and superheating in the heat exchangers 6 to 8 of FIG. 1 at a pressure of about 180 atmospheres. The curve between the points 102 and 103 represents expansion in the turbine 15 to about 60 atmospheres. The expansion is so limited that the vapor stays substantially dry with little, if any, incursion into the wet steam zone of the diagram. Introduction of water droplets into the reactor might under some circumstances lead to corrosion, and this risk is avoided by so limiting the expansion. The curves between the points 103 and 104, 105 and 106, 107 and 108 and 110 and 111 correspond to four successive superheatings in the four sets of reactors cooling channels 2 to 5 of FIG. 1 and 51 to 54 of FIG. 2. The curve segments 104 to 105, 106 to 107 and 108 to 110 (not drawn in on FIG. 3 because of lack of space) represent surrender of heat by the working substance in the heat exchangers 6, 7 and 8 of FIG. 1 or 57, 55 and 56 (at coils 75 and 76) and 55 and 56 (at coils 80 and 81) in FIG. 2. The curve between the points 111 and 112 represents expansion in the second turbine stage 26 in FIG. 1 or 84 in FIG. 2.

The number of passages through the reactor is not of course limited to the four passages shown in the two examples hereinbefore described. In case where the working substance flows through the reactor several times, the feed pump overcomes the pressure drop in the entire load circuit, and there is no need for a circulator to increase the pressure of the working substance in its vapor state. On the other hand, the reactor must be constructed to permit the working substance to make a number of passages through it, the pressure being different at each passage.

The invention is also applicable in nuclear reactors wherein the load medium passes only once through the reactor core, as for instance in reactors having pressure vessels. In this case, if sufficient heat is to be available to evaporate and superheat the working substance before its entry into the turbine, the rate of flow thereof through the reactor must, as a rule, be larger than the rate of flow thereof through the high-pressure turbine. To this end, the working substance may be divided into two streams, for example downstream of the reactor. One stream goes to a load, e.g., to the low-pressure turbine and comprises the same proportion of the working substance as that which after condensation and preheating is fed to the secondary side of the heat exchanger. The other stream goes from the reactor to the primary side of the heat exchanger. The quantity flowing in this second stream is such that the heat evolved during cooling in the heat exchanger can preheat, evaporate and superheat the first stream. A pressure-increasing device compresses the second stream, after it has gone through the heat exchanger, to the pressure suitable to be maintained upstream of the reactor. The second stream is mixed at substantially this pressure with the first stream upon emergence of the latter from the high-pressure turbine, and the two are returned together to the reactor for reheating.

Figure 4:
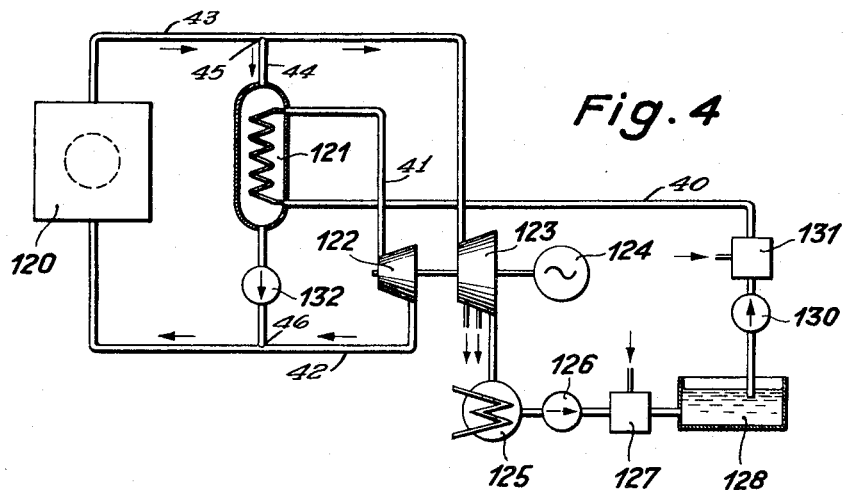

Such an embodiment is shown in FIG. 4 where there can be seen a reactor 120, a heat exchanger 121 for preheating, evaporating and superheating a working substance supplied thereto by a feed pump 130, a high-pressure stage 122 of a turbine and a low-pressure stage 123 thereof, the turbine driving an electric generator 124. The working substance flows from the low-pressure turbine 123 to a condenser 125 whence a condensate pump 126 delievers it via a preheater 127 to a feed tank 128. A feed pump 130 removes liquid working substance from tank 128 and delivers it through a preheater 131 and a first conduit 40 to the heat exchanger 121. In the exchanger 121 the shell constitutes the primary side from which heat is transferred to the coil, constituting the secondary side of the exchanger. The working substance which has been evaporated and superheated in the heat exchanger 121 passes through an extension 41 of the first conduit 40 to the turbine high-pressure stage 122 and thence, after expansion therein, through a further extension 42 of the first conduit 40 to the reactor 120. The superheated working substance vapor leaving the reactor 120 divides into two streams, one of which goes to the turbine stage 123 and the other of which goes through the primary side of heat exchanger 121 and thence through a circulator 132. More particularly, a further extension 43 of the first conduit 40 leads from the reactor 120 to the second turbine stage 123. A second conduit 44 leads from a first junction 45 with the extension 43 of the first conduit through the primary side of the heat exchanger 121 and the circulator 132 to a second junction 46 with the portion 42 of the first conduit.

Figure 6:
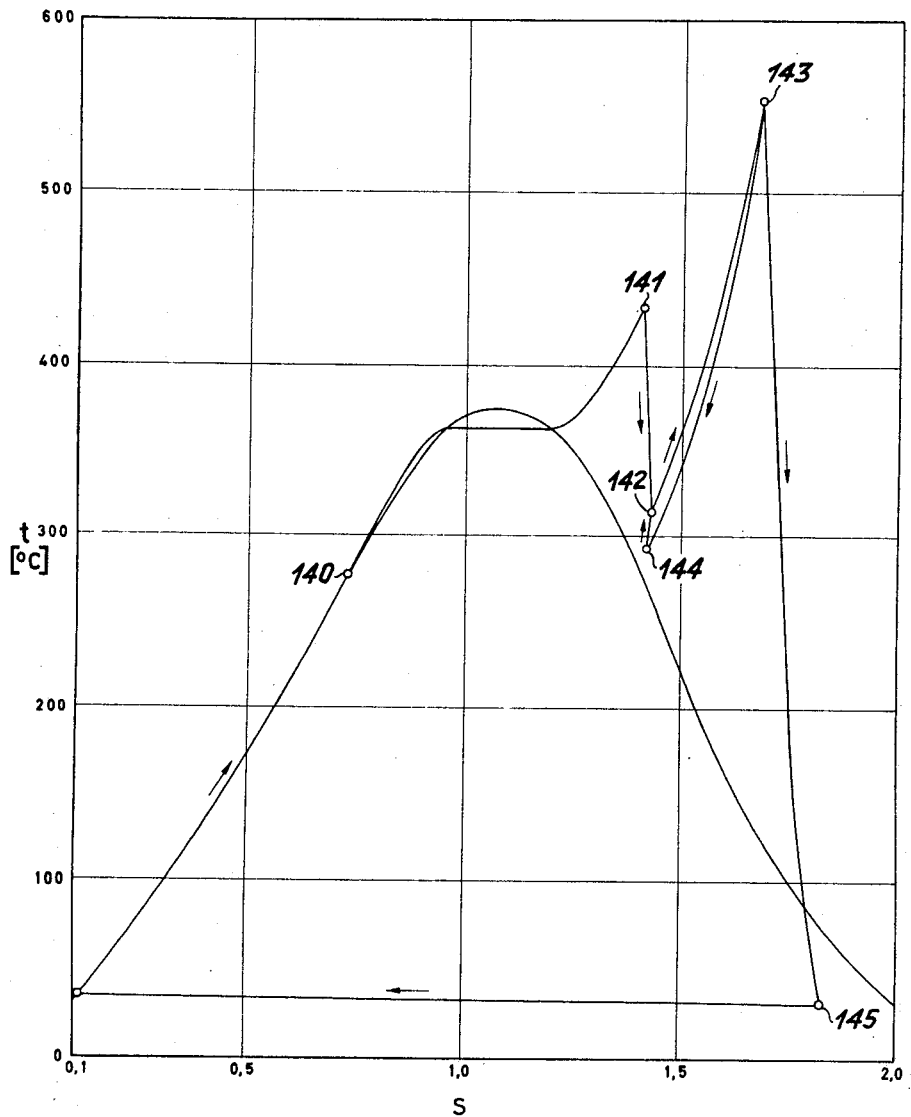
FIG. 6 is a temperature-entropy diagram for the plant shown in FIG. 4.

A temperature-entropy diagram for water and water vapor as the working substance and corresponding to FIG. 4 is given in FIG. 6. The curve between the points 140 and 141 represents preheating in preheater 131 and evaporation and superheating in exchanger 121 of the working substance at a pressure of about 180 atmospheres absolute. The curve between the points 141 and 142 represents expansion in the turbine stage 122 to about 60 atmospheres absolute, and the curve between the points 142 and 143 represents reheating in the reactor. The curves between the points 143 and 144 and between 144 and 142 correspond to the circuit through the primary side of heat exchanger 121 and circulator 132, which in this case is a blower. The curve between the points 143 and 145 corresponds to expansion in the turbine 123.

The invention also comprises embodiment wherein some of the working substance is injected into the cooling circuit and evaporated therein, at a pressure corresponding substantially to the pressure after expansion in the high-pressure turbine. In such case, that proportion of the working substance which has thus been evaporated is mixed without previous expansion with the flow through the reactor. In such an embodiment the heat exchanger wherein the working substance is evaporated at low pressure can be a mixing evaporator. Advantageously then, the vapor component of working substance serving to effect evaporation of further working substance first goes, after flowing through the reactor, through the heat exchanger providing evaporation at the higher pressure, the vapor yielding therein some of the heat which it has received in the reactor, and thereafter entering the mixing evaporator. This feature helps to reduce the quantity of heat to be exchanged in the high-pressure heat exchanger and also to increase the temperature drop therein.

Figure 5:
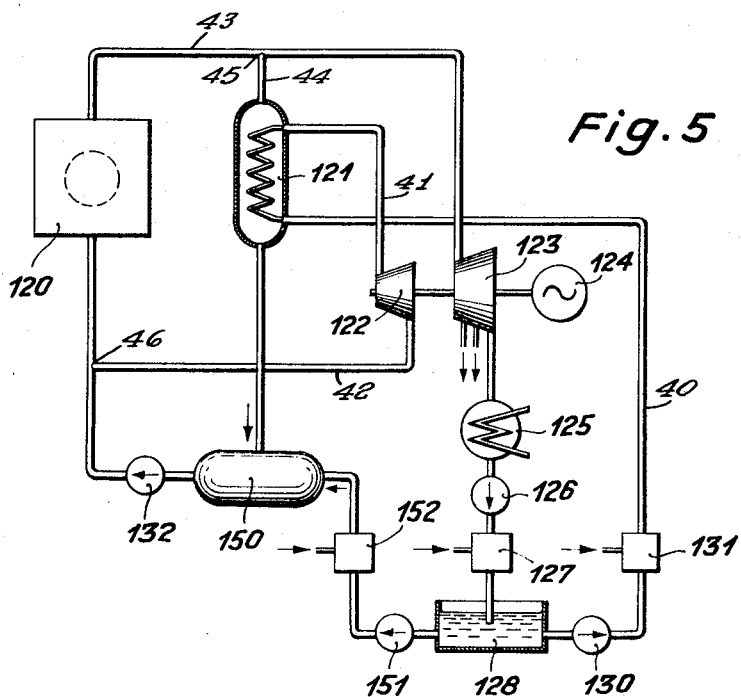

FIG. 5 shows an embodiment of the type described in the preceding paragraph. Portions of the system corresponding to the embodiment shown in FIG. 4 have like reference characters. In addition however the embodiment of FIG. 5 includes a mixing evaporator 150 which receives the vapor from the primary side of heat exchanger 121 and into which a feed pump 151 injects liquid working substance via a preheater 152. The vapor evolved in the evaporator 150 goes through the circulator 132 and is mixed with the working substance in the line extending from the high-pressure turbine 122 to the input to reactor 120.

The invention also comprises systems wherein some of the working substance vapor circulates through the reactor and the heat exchanger. In contrast to the embodiments shown in FIGS. 4 and 5, the circulating flow makes in such an embodiment a number of consecutive passages through the reactor, as in the embodiments shown in FIGS. 1 and 2. Embodiments of this form are shown in FIGS. 7 and 8.

Referring to FIG. 7, a feed pump 160 withdraws liquid working substance from a feed tank 161 and delivers it through preheaters 162, 163 and a line 164 to coils 165 and 166 constituting the secondary side of heat exchangers 167 and 168 respectively. The working substance is evaporated and superheated in the coils 165 and 166 and passes through a line 170 to a high-pressure turbine 171, driving an electric generator 172 and a circulating blower 173. From the turbine 171 the vapor passes through a line 174 into a reactor 175, is superheated therein, and passes through a line 176 to the primary side of the heat exchanger 167. The working substance vapor leaves the exchanger 167 through a line 177 to re-enter the reactor 175 for further superheating. From the reactor 175 the vapor passes to a line 178, from which a portion of the vapor passes to the primary side of heat exchanger 168, thence through blower 173 wherein its pressure is raised and it is mixed with the vapor exhausted from the turbine 171. A minor proportion of the vapor from the line 178 goes to a low-pressure turbine 180, which drives a generator 181, and thence to a condenser 182 whence a condensate pump 183 delivers the liquid working substance through a preheater 184 to the feed tank 161.

In the arrangement shown in FIG. 8, a first feed pump 201 withdraws liquid working substance from a feed tank 200 and supplies it through a preheater 202, a second feed pump 203 and a preheater 204 to a coil 205 constituting the secondary side of a heat exchanger 206, the working substance being evaporated and superheated in the coil 205. The superheated vapor passes from the coil 205 through a line 207 to a high-pressure turbine 208. After partial expansion therein the vapor passes through lines 210 and 211 to a reactor core 212 for further superheating. The vapor passes from the reactor core through a line 213 to the primary side of the heat exchanger 206, yields therein the heat received during superheating, and then returns through a line 214 comprising a circulating blower 215 to the reactor core 212. After further superheating therein the vapor enters a line 216 extending to the line 211. A portion of the superheated vapor goes from the line 216 through a line 217 to a low-pressure turbine 218 driving an electric generator 220. From the turbine 218 the working substance passes through a condenser 221, a condensate pump 222 and a preheater 223 to the feed tank 200. Downstream of the junction with the line 217 the line 216 has a mixing zone 224 where some of the feed water from the feed pump 201 is injected via a line 225 into the superheated vapor in the line 216. Consequently, in this embodiment, just as in the embodiment shown in FIG. 5, some of the working substance is supplied directly to the lower-pressure circuit.

There are of course difficulties in starting up reactor plants comprising a vapor-cooled reactor. The reason for this is that an external source of vapor must be provided for starting, and the plant must also have a special start-up flow system to permit the plant to be preheated and set in operation by means of externally generated steam. An exemplary start-up system of this kind is shown in FIGS. 1 and 2. For start-up there is provided in FIG. 1 a vapor generator 250 including a superheater 251 which can supply steam to the line 13 through a valve 252, this valve being closed in normal operation of the plant. The line 13 can be closed by a valve 253 during start-up. For starting purposes the high-pressure turbine 15 has a bypass 254 including a valve 255. Valves 256 and 257 permit steam flow through the turbine to be shut off during starting. The lines 17, 20, 22, 24 have starting heaters 258 to 261 which heat the steam before it enters the reactor channels if the temperature of the reactor core at starting is lower than the temperature of the steam. The starting heaters may take the form of vapor-heated heat exchangers or electric heaters. Also, the line 25 has connected to it a line 262 through which the steam returns to the generator 250 after having been cooled in the reactor plant. Condensed steam goes from the line 262 through a line 263 to the tank 10 whence a feed pump 264 can inject the liquid working substance into the steam generator 250.

In the embodiment shown in FIG. 2 there is provided for start-up a steam generator 270 having a superheater 271 from which steam passes through a line 272 to the evaporators 55 and 56. The steam is injected into the water space of the evaporators, with the result that the water therein heats up and boils. Also, steam can pass through a line 273 comprising a throttle element 274 to the steam spaces of the evaporators 55, 56. The turbine 68 has a bypass 275 including a valve 276, the lines to and from the turbine being closable by means of valves 277 to 279. As in the example shown in FIG. 1, the lines 71, 73, 77, 82 are provided with heaters 280 to 283 respectively. The line 83 has a valve 284 can be connected via a line 285 having a valve 286 therein and via the feed water preheater 66, to the feed tank 63.

These starting systems have of course been described only as examples. Other starting sytems can be used to start-up the vapor-cooled nuclear reactor plants according to the invention.

While the invention has been described herein in terms of presently preferred modes of practice thereof and in terms of presently preferred forms of apparatus, the invention is not limited thereto but comprehends all modifications thereof and departures therefrom falling within the spirit and scope of the appended claims.

I claim:

1. A nuclear power plant comprising a reactor, a pump, an evaporator and a superheater each having a primary side and a secondary side, two turbines, and conduit means extending from the pump through the secondary side of the evaporator, the secondary side of the superheater, the first turbine, through the reactor, through the primary side of the superheater, through the reactor a second time, through the primary side of the evaporator, through the reactor a third time, and through the second of said turbines.

2. A nuclear power plant comprising a reactor, a pump, heat exchange means having primary and secondary sides to evaporate and superheat a vaporizable working substance, two turbines, first conduit means extending from the pump through the secondary side of the heat exchange means, one of the turbines, the reactor, and the other of said turbines, and second conduit means extending via the primary side of the heat exchange means from a first junction with said first conduit means intermediate the reactor and second turbine to a second junction with said first conduit means intermediate said first turbine and the reactor.

3. A nuclear power plant according to claim 2 including a mixing evaporator connected in said second conduit means between the primary side of the heat exchange means and said second junction, and means to inject liquid working substance into said mixing evaporator.

4. A nuclear power plant comprising a reactor, a pump, heat exchange means to evaporate and superheat a vaporizable working substance, two turbines, first conduit means extending from the pump through the secondary side of the heat exchange means and a first of the turbines, and second conduit means extending from the downstream end of said one turbine through the reactor, through the primary side of the heat exchange means, and through the reactor a second time to the other of said turbines.

References Cited

UNITED STATES PATENTS

| 3,108,938 | 10/1963 | Nettel et al. | |
| 3,152,962 | 10/1964 | Kagi | 176—60 X |
| 3,161,572 | 12/1964 | Kagi | 176—60 X |
| 3,164,527 | 1/1965 | Brunner | 176—60 X |
| 3,175,953 | 3/1965 | Nettel et al. | 176—60 |
| 3,210,943 | 10/1965 | Acklin | 176—60 X |
| 3,242,053 | 3/1966 | Sanders et al. | 176—65 X |

FOREIGN PATENTS 897,416   5/1962   Great Britain.

REUBEN EPSTEIN, *Primary Examiner.*